United States Patent [19]
Duwez

[11] 3,756,461
[45] Sept. 4, 1973

[54] DEVICE FOR PREDETERMINING THE QUANTITIES OF LIQUID DELIVERED BY A LIQUID METER

[75] Inventor: Raymond Duwez, Levallois-Perret, France

[73] Assignee: Compagnie Des Compteurs, Paris, France

[22] Filed: June 2, 1971

[21] Appl. No.: 149,270

[30] Foreign Application Priority Data
June 5, 1970 France .............................. 7020721

[52] U.S. Cl. .............................................. 222/20
[51] Int. Cl. ........................................... G01f 11/30
[58] Field of Search................... 222/20; 137/624.11

[56] References Cited
UNITED STATES PATENTS

| | | | |
|---|---|---|---|
| 3,473,695 | 10/1969 | Anesi................................... | 222/20 |
| 3,128,910 | 4/1964 | Calhoun................................ | 222/20 |
| 3,166,217 | 1/1965 | Carriol.................................. | 222/20 |
| 3,199,728 | 8/1965 | Taylor et al. ........................ | 222/20 |
| 3,497,106 | 2/1970 | Clarke .................................. | 222/20 |

Primary Examiner—M. Henson Wood, Jr.
Assistant Examiner—Michael Mar
Attorney—William R. Sherman, Stewart F. Moore, Jerry M. Presson, Leonard R. Fellen and Roylance, Abrams, Berdo and Kaul

[57] ABSTRACT

One described embodiment of a device for predetermining the quantities of liquid delivered by a meter, said meter having a valve to control the delivery and means for measuring the quantity of liquid delivered, comprises a rotatable cam and a transmission having a variable transmission ratio adapted to be driven by said quantity measuring means for rotating said cam. A valve closure controlling lever having a portion engageable with said cam is arranged for closing said valve in at least one angular position of said cam upon completion of a constant angular displacement by said cam from a stop position. A selector is provided for choosing a desired transmission ratio and thus selecting a predetermined quantity of liquid to be delivered while the cam rotates through said constant angular displacement. The lever is temporarily inhibited from on the valve upon opening of said valve to rotate said cam from said at least one angular position through said constant displacement thus permitting the start of a new delivery of the same predetermined quantity by just opening the valve.

15 Claims, 6 Drawing Figures

DEVICE FOR PREDETERMINING THE QUANTITIES OF LIQUID DELIVERED BY A LIQUID METER

This invention relates generally to devices for predetermining the quantities of liquid delivered by liquid meters, and is particularly useful in an installation for filling containers of a given capacity (10 or 50 liters, for example.)

Known devices for predetermining the quantity of liquid delivered by a liquid meter ( or predeterminators for short), generally comprise actuating means such as cam means including a notched disc driven by a liquid quantity measuring device in the liquid meter, which is responsive to the quantity of liquid delivered by a valve. The disc can be angularly shifted with respect to an origin position, called the zero position, through an angle proportional to the quantity of liquid to be delivered. The angle through which the notched disc is shifted is indicated by means of a needle, rigid with the notched disc, which moves across a graduated dial. The delivery valve for the liquid is then opened, and maintained in the open position by a trip lever, one end of which rests on the periphery of the notched disc. In the course of the delivery, the quantity measuring device of the liquid meter drives the notched disc in rotation, which drives the needle towards the zero position, in which position the trip lever falls into the notch of the disc and thereby causes the closing of the valve. The preset quantity of liquid has then been delivered.

If it is desired to deliver the same quantity of liquid again, one must necessarily recommence the same presetting operation as previously. In order to avoid this disadvantage some predeterminators are equipped with an automatic reiteration device which, at the end of the delivery, brings the notched disc and the needle back to their starting position. The only operation to be accomplished in this case is to open the delivery valve. The device is thus convenient to use but is of a delicate and complicated construction.

An object of the present invention is to provide an improved predeterminator to avoid the use of such an automatic reiteration device, without introducing the necessity of effecting a further adjustment of the actuating means.

Another object of the invention is to provide an improved and simpler predeterminator for controlling the delivery of various predetermined quantities of liquid, which can be preset for a given quantity of liquid without modifying the actuating means.

According to an aspect of the invention a device for predetermining the quantities of liquid delivered by a meter comprises rotatable cam means, transmission means adapted to be driven by said quantity measuring means for rotating said cam means, and valve closure control means having a portion engageable with said cam means for closing said valve means in at least one angular position. of said cam means upon completion of a constant angular displacement by said cam means from a stop position. On closure of said valve means the delivery stops and said cam means is stopped in said at least one angular position, upon delivery of a predetermined quantity. Means for temporarily inhibiting said valve closure control means upon opening of said valve means are provided to rotate said cam means from said at least one angular position, through said constant angular displacement. Thus, when the cam means is stopped in at least one angular position under the action of said valve control closure means, it can be started again from this position by just opening the valve means without any further adjustment of the cam means, thus avoiding the need for an automatic reiteration device.

According to another aspect of the invention, a device for predetermining the quantities of liquid delivered by a meter, said meter having valve means to control the delivery and means for measuring the quantity of liquid delivered, may comprise valve closure control means, and means operatively coupled to said valve closure control means for actuating said valve control means to thereby close said valve upon completion of a constant displacement by said actuating means from a stop position. Transmission means are adapted to be coupled to said quantity measuring means for driving said actuating means, said transmission means having a variable ratio, whereby different predetermined quantities of liquid delivered can produce said constant displacement of said actuating means. Selector means are further provided for selecting desired transmission ratios for said transmission means. The presetting of the determinator can thus be made through this selector independently from the actuating means and, whatever the liquid quantity to be delivered may be, the actuating means will complete a constant displacement before causing the closure of the valve.

Other objects and aspects of the invention will become apparent from the following description of exemplary embodiments given with reference to the accompanying drawings, in which.

In FIGS. 1, 2, 3, and 4 can be seen the frame of a predeterminator constituted of four side plates, respectively 1, 2, 3 and 4 assembled by struts such as 5 and screws such as 6. The predeterminator is associated with a liquid meter not shown placed on a delivery pipe, said liquid meter including a delivery valve and a liquid quantity measuring device which is responsive to the quantity of liquid delivered by the valve. The liquid quantity measuring device, not shown, drives the predeterminator by transmission means including a crank 7 fixed on a shaft 8 on which is also fixed a cone of gears 9 comprising five parallel gears of different diameters respectively 10, 11, 12, 13 and 14, the numbers of teeth of which are respectively proportional to the ratios 1/5, 1/4, 1/3, 1/2 and 1/1. A second shaft 15 parallel to shaft 8 and journalled in the side plates 1 and 2 is rigid both with an elongated gear 16, whose teeth extend over a considerable length(at least equal to the height of the cone 9), and with a worm 17. On a fixed shaft 18 parallel to shafts 8 and 15 are journalled five pivotable selector arms, respectively 19, 20, 21, 22 and 23, each having a toothed selector wheel such as 24, constantly in engagement with the corresponding gears of the cone 9, said toothed wheels such as 24 being mounted at the end of each selector arm. Only one of these selector wheels engages with the gear 16 at any given time, according to the predetermined quantity of liquid to be delivered, as will be explained hereafter.

Figure 1:
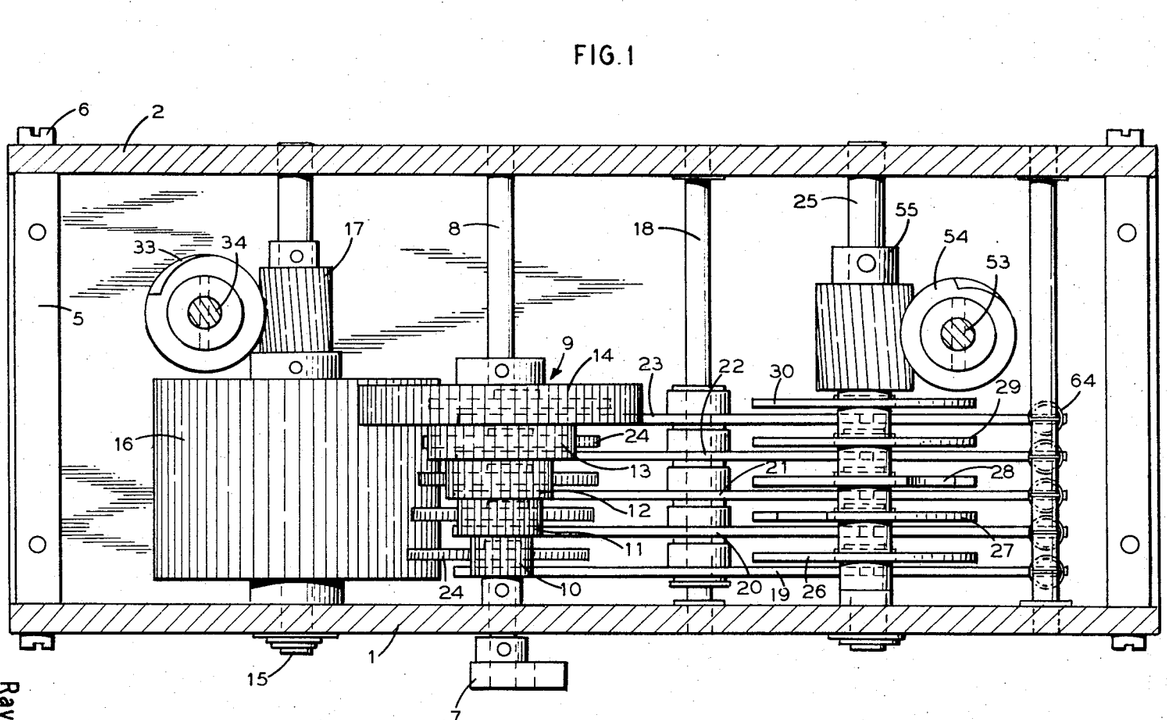
FIG. 1 is front view in section of a predeterminator taken along the line I—I of FIG. 2.
Figure 2:
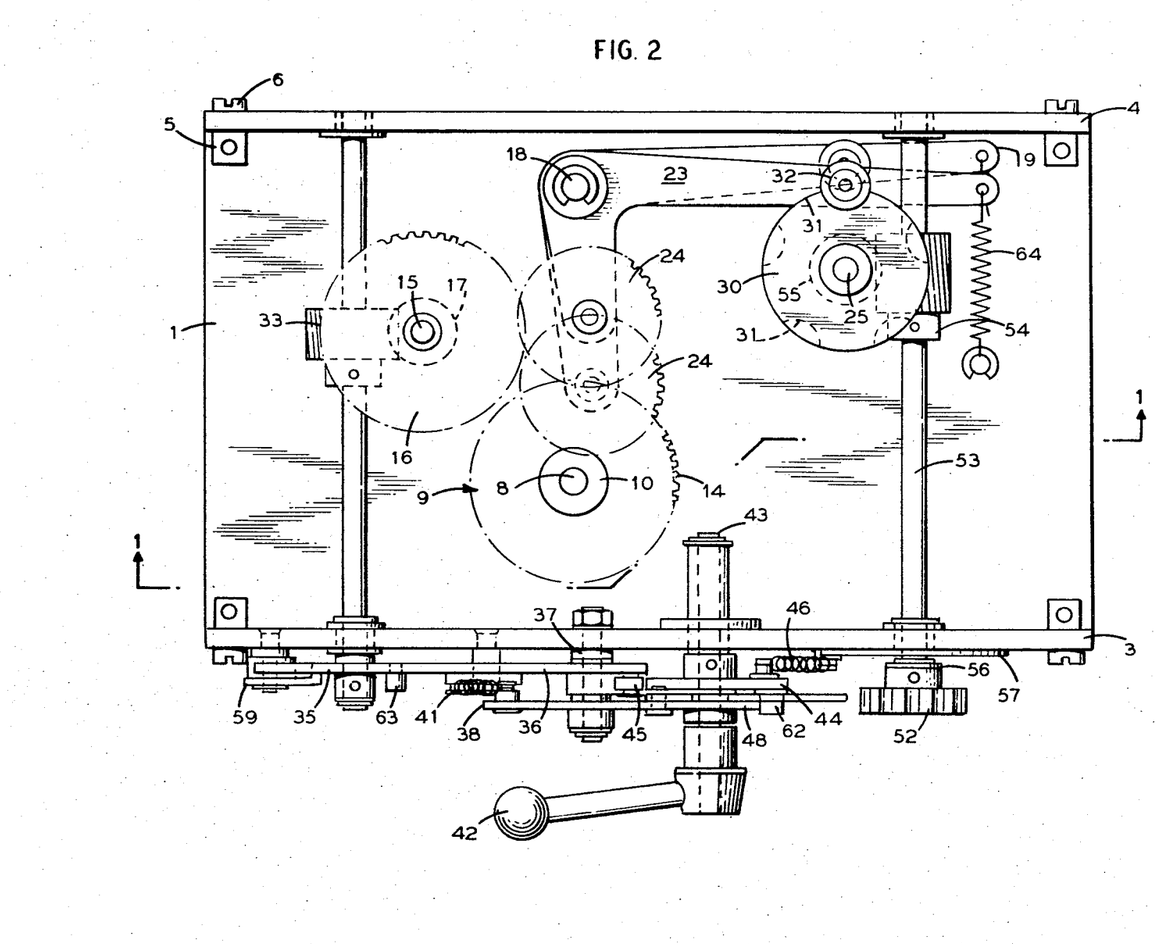
FIG. 2 is a plan view of the predeterminator of FIG. 1 with the upper side removed, on a reduced scale.

FIG. 2 shows only two of these selector arms, 23 and 19. The wheel 24 of selector arm 23 engages both with the gear 16 and with the wheel 14 of the cone 9; the wheel 24 of selector arm 19 engages only with the wheel 10 of the cone 9.

A shaft 25, journalled in the side plates 1 and 2, is rigid with five cams, respectively 26, 27, 28, 29 and 30, (FIG.1), keyed on to it, and cooperating respectively with the selector arms 19, 20, 21, 22 and 23. As seen in FIG. 2, each cam has a circular part concentric with the shaft 25, and a notch 31 in which can be lodged a roller 32, carried by the corresponding selector arm. Rollers 32 are pressed against corresponding cams through action of return springs such as 64.

Since the various notches 31 are offset with respect to one another by an angle of 72°, only a single roller 32 can be lodged in a notch 31 at any one time, which ensures the clutching of only a single selector wheel, which is brought into joint engagement with both the cone 9 and the gear 16 by proper pivoting of the corresponding selector arm about axis 18. In the position shown in FIG. 2, the selector wheel 24, mounted on selector arm 23 puts into engagement the gear 14 of the cone 9 with the gear 16, for the purpose of delivering 10 liters.

Figure 3:
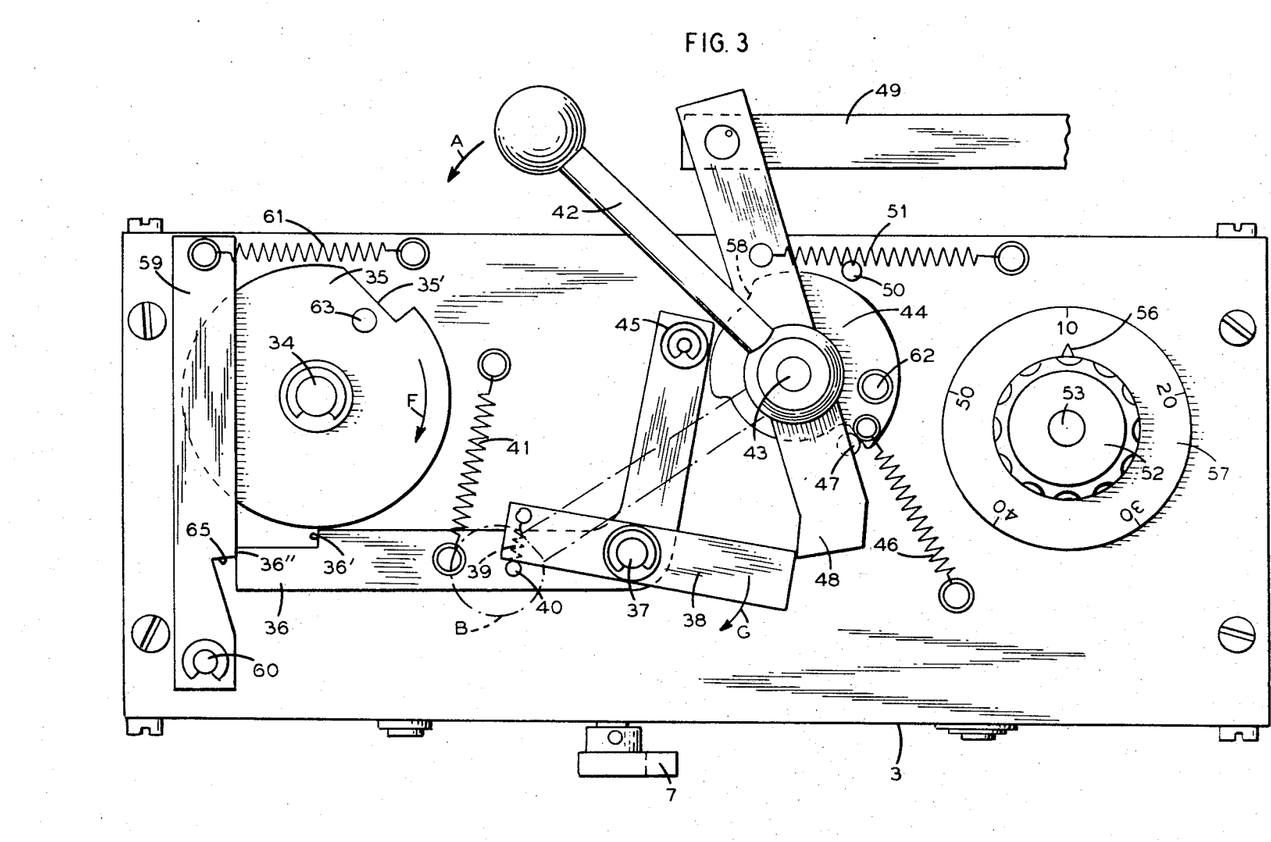
FIG. 3 is a front view showing the presetting control and the controls for the valve, in the course of delivery, with the valve open.
Figure 4:
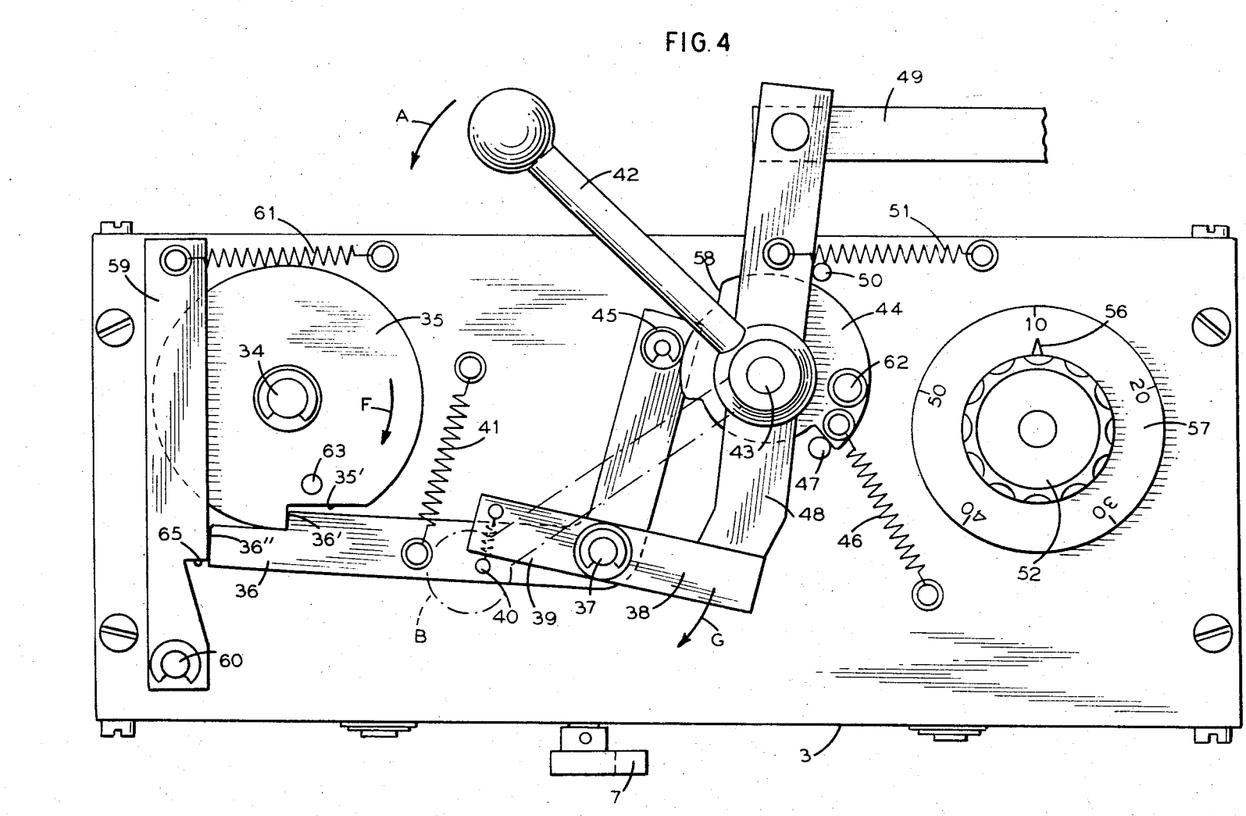
FIG. 4 is an analogous view to that of FIG. 3 at the end of a delivery, with the valve closed.

The worm 17 engages with a helical wheel 33 rigid with a shaft 34 (FIG. 2), at the end of which is fixed cam means formed by a disc having a notch 35' (FIGS. 3 and 4). This notch 35' has a step-like leading edge when considering the direction of rotation of the disc 35 (arrow F). For controlling the closure of the valve, this disc cooperates with a lever 36, articulated freely on a pivot 37, as is a stop 38 which is returned by a spring 39 to a stud 40 on the lever 36. A spring 41 constantly urges the lever 36 against the periphery of the disc 35. This lever 36 has a tipped portion 36' which drops abruptly in the notch 35' of the disc 35, when the disc 35 comes into the proper angular position as represented in FIG. 4.

If the selector wheels are successively engaged with the gear 16, the disc 35 can complete successive constant angular displacements of one full revolution for respective angular displacements, or number of turns, of the shaft 8 which are respectively proportional to the inverse of the preceding number of teeth ratios, that is to say proportional to 5, 4, 3, 2, 1. As the angular displacement or number of turns of the shaft is representative of the quantity of liquid delivered, the predetermined quantities delivered during one revolution of the disc 35 can be respectively equal to 50, 40, 30, 20 and 10 liters with a suitable transmission ratio.

A handle 42 is fixed on a shaft 43. On this shaft 43 is also fixed a cam 44 which cooperates with a roller 45 mounted on the lever 36. A spring 46 returns the cam 44 against a fixed stud 47. An arm 48, mounted freely rotatable about the shaft 43, is connected to the liquid delivery valve by a rod 49 and can be driven in rotation by a stud 62 on the cam 44 until it is held against the stop 38 in the open position of the valve under the action of a return spring 51, (See FIG. 3). If the stop 38 turns slightly in the direction of the arrow G it unlatches the arm 48 which comes in contact with a fixed stud 50 under the action of the spring 51 (see FIG. 4), in a rest position. A catch 59 rotatably mounted on a pivot 60 has a notch 65 in which the end tip 36'' of the lever 36 can come into engagement. The catch 59 is urged against the end tip 36'' by means of a traction spring 61, having one end secured to the catch and its other end to the frame of the predeterminator.

The operation of setting the predetermined quantity of liquid is done by means of an adjustable knob 52, fixed on a shaft 53 (FIG. 2). A helical wheel 54 keyed on shaft 53, drives a helical wheel 55, rigid with the shaft 25, and with the cams 26, 27, 28, 29 and 30. The shaft 53 also carries a needle 56 which moves in front of a graduated dial 57 (FIGS. 2 and 3).

The predeterminator operates in the following manner:

At the end of a delivery, when the valve is closed, the control means for setting the quantity and for opening the valve are in the position shown in FIG. 4. If it is desired to reiterate the quantity of liquid previously delivered, which is still indicated on the dial 57 (i.e., 10 liters), there is no need to change the adjustment of the knob 52. It is simply necessary to open the valve again. To this end, the handle 42 is brought from the position A to the position B, and is then allowed to return to the position A under the action of the spring 46. In the course of this movement, the cam 44 pushes away, by means of its ramp 58, the roller 45 of the lever 36. The lever 36 is disengaged from the disc 35 and engages with its left end tip 36'' in the notch 65 of the catch 59 which is articulated on the pivot 60 and urged against the lever 36 by the spring 61. In this position the means controlling the closure of the valve, including the lever 36, are temporarily disabled or inhibited. When the handle 42 has swept through a certain angle, the stud 62 of the cam 44 drives the arm 48, which, via the intermediary of the rod 49, opens the valve and then trips against the stop 38 (see FIG. 3) which latches this arm 48 thus maintaining the valve open.

Then as the handle 42 is released, the cam 44 comes to bear against the stud 47 under the action of the spring 46. The delivery of the liquid commences. The output shaft 8 from the liquid quantity measuring device in the meter drives the notched disc 35 in the direction of the arrow F, via the intermediary of the kinetic chain constituted by the cone of gears 9, the selector wheel mounted on selector arm 23, the gear 16, the worm 17, the helical wheel 33 and the shaft 34. The notched disc 35 carries a stud 63 which knocks off the catch 59, thus liberating the lever 36 which then comes to bear against the periphery of the notched disc 35 (see FIG. 3) after that disc has turned through an angle sufficient to avoid a premature closing of the valve. When this disc has effected one complete revolution, the lever 36 falls into the notch of the disc 35, driving, via the intermediary of the stud 40, the stop 38 in the direction of the arrow G. The knocking off of the stop 38 thus releases the arm 48 permitting the valve to close under the combined effect of the return spring 51 and the thrust of the liquid. Thus the disc 35 when coming back in the angular position of FIG. 4, actuates the trip lever 36 for controlling the closure of the valve. The delivery is terminated. A new delivery of the same quantity can be started by just opening the valve again through the manually controlled means described above.

If, at the end of a delivery, it is desired to change the predetermined quantity, the knob 52 is turned until the needle 56 is placed on the desired quantity of liquid. This operation declutches the selector arm which had previously put the gear cone 9 in engagement with the gear 16— i.e., in the case of FIG. 2, the selector arm 23 — by removing the roller 32 of this selector from the notch 31 of the cam 30. The selector arm corresponding to the new quantity of liquid to be predetermined is then clutched into transmission position, for example the selector arm 19 for a quantity of 50 liters, by making the roller 32 of this selector fall into the notch 31 of the cam 26. The needle 56 is then in front of the division 50 of the dial 57. It is thus sufficient to open the valve by moving the handle 42, as was indicated previously. For one revolution of the notched disc 35, a quantity of 50 liters will then be delivered.

Figures 5, 5A:
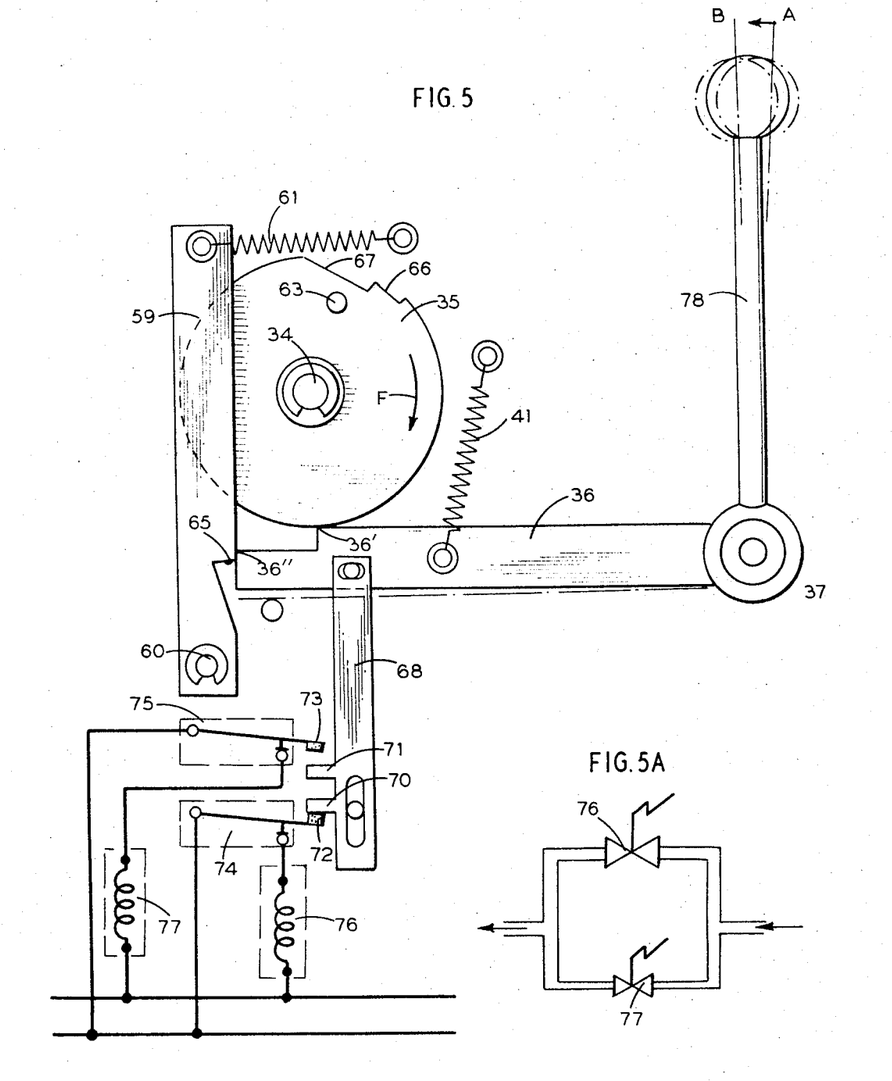
FIGS. 5 and 5a show another embodiment of the invention.

FIGS. 5 and 5a illustrate a variant using electro-valves where the parts identical to those of the previously described embodiment keep the same reference numerals. Instead of a mechanical valve, the predeterminator comprises two electro-valves 76 and 77, each of them being disposed in a bypass of the liquid conduit, as is shown in FIG. 5a. The valve 76 has a high flow rate; the valve 77 has a low flow rate. The presetting knob 52 of the predeterminator previously described remains, but the handle 42 for opening the mechanical valve is here replaced by a handle 78 directly coupled to the trip lever 36.

In FIG. 5 can be seen the disc 35 rigid with the shaft 34, the lever 36 articulated on the pivot 37 and urged against the periphery of the disc 35 by the spring 41, the catch 59 articulated on the pivot 60 and urged against the lever 36 by the spring 61. The lever 36 is connected to a rod 68 whose stops 70 and 71 control the arms 72 and 73 of switches 74 and 75, to close or open the circuits of the electro-valves 76 and 77. As is seen in FIG. 5, the disc 35 has two overlapping step-like notches 66 and 67.

The predeterminator according to this variant operates as is explained hereafter:

FIG. 5 shows the predeterminator in the course of delivery. The lever 36 bears against the periphery of the disc 35. The stop 71 of the rod 68 has moved away from the arm 73 of the self-closing switch 75, which has closed the circuit of the low flow rate electro-valve 77. The stop 70, bearing against the arm 72 of the self-opening switch 74, has closed the circuit of the high flow rate electro-valve 76. By turning in the direction of the arrow F, the notch 66 of the disc 35 is the first to present itself to the tipped portion 36' of the lever 36. This portion, by falling into the notch 66, drives the rod 68 which opens the circuit of the switch 74, and consequently, that of the electro- valve 76 but without engaging the arm 73 of switch 75. The electro-valve 76 ceases to deliver, thus suitably slowing down the delivery of the liquid. Then the notch 67 presents itself in its turn and the tipped portion 36' of the lever 36, by falling into this notch, drives the rod 68 whose stop 71, coming to bear against the arm 73 of switch 75, opens the circuit of this switch, as well as that of the low delivery rate electro-valve 77. The delivery is then terminated.

In order to effect a new delivery, the handle 78, rigid with the lever 36, is turned from the position A to the position B, where the lever 36 engages in the notch 65 of the catch 59. In the course of this operation, the rod 68 causes, first, via the stop 71, the closing of the circuit of the switch 75 and of the electro-valve 77, and then, via the stop 72, the closing of the circuit of the switch 74 and of the electro-valve 76. The disc 35 turns and the stud 63 pushes away the catch 59 thus liberating the lever 36 which comes to bear against the notched disc 35. The delivery continues as has been indicated previously.

The predeterminators which have just been described have numerous advantages. They are of a particularly simple conception, having regard to the usual automatic reiteration devices and can furthermore be of higher precision. This latter quality results, for devices having a cam or notched disc performing a complete revolution, from the fact that the angular error, at the moment of the fall of the lever into the notch of the disc, can be smaller in relative value when it is relative to a complete revolution instead of a fraction of a revolution as is the case with conventional devices.

Although the invention has been described with reference to a particular embodiment, it is not limited thereby and modifications can be made without departing from its scope. Thus for example a predeterminator can be arranged to deliver six different quantities of liquid, by providing a cone having six gears, an assembly of six selectors and six notched cams, these cams being angularly spaced by 60°. More generally, the invention covers, in addition to the example described, other possible embodiments within the scope of the appended claims.

What is claimed is:

1. Device for predetermining the quantities of liquid delivered by a meter, said meter having means for measuring the quantity of liquid delivered and valve means to control the delivery comprising:

a rotatable cam;

transmission means having an adjustable transmission ratio adapted to be driven by said quantity measuring means for rotating said cam at a rate depending on such transmission ratio for any liquid delivery rate;

valve closure control means having a portion engageable with said cam for closing said valve means in at least one angular position of said cam upon completion of a constant angular displacement by said cam from a stop position, whereby said cam is stopped in said at least one angular position, upon delivery of a quantity of liquid predetermined by the transmission ratio of said transmission means;

means for temporarily inhibiting said valve closure control means upon opening of said valve means to rotate said cam from said at least one angular position, through said constant angular displacement; and selector means for adjusting the transmission ratio of said transmission means to select a predetermined quantity of liquid to be delivered.

2. Device as defined in claim 1, wherein at least one notch is formed in said cam, said notch having a step-like leading edge with respect to the direction of the rotation of the cam, and said valve closure control means includes a trip lever operatively coupled to said valve means and having a feeler portion engageable with said cam to drop abruptly into said notch in said at least one angular position of said cam to initiate the closure of said valve means.

3. Device as defined in claim 2, wherein said cam has only one said notch for closing said valve means in one angular position only, upon completion of a full revolution by said cam from a stop position.

4. Device according to claim 1, wherein said temporarily inhibiting means comprise catch means, and knock off means on said cam, further including manually controlled means for opening said valve means operatively coupled to said valve closure control means to disengage the cam engageable portion thereof from said cam and bring said valve closure control means into engagement with said catch means upon opening of said valve means, said knock off means on said cam being engageable with said catch means to release said valve closure control means upon rotation of said cam from said at least one angular position, through an angle smaller than said constant angular displacement.

5. Device according to claim 4 wherein said manually controlled valve opening means comprises: a valve actuating arm biased toward closure of the valve means; a handle for driving said actuating arm into opening position for the valve means; latch means to retain said actuating arm in said opening position, said valve closure control means having release means for engaging said latch means to release said actuating arm for movement initiating closure of the valve means upon completion of said constant angular displacement by said cam.

6. Device as recited in claim 1 for a meter in which the valve means comprise first and second delivery valves in parallel, the first valve having a high delivery rate and the second valve having a low delivery rate, wherein said cam has first and second overlapping notches with respective first and second step-like leading edges into which the cam engageable portion of said valve closure control means can successively drop on rotation of the cam, and said valve closure control means is adapted to be operatively coupled to the first and second valves for initiating closure of the first valve means when the cam engageable portion thereof drops along said first step-like edge and thereafter of the second valve means when such cam engageable portion drops along said second step-like edge.

7. Device as recited in claim 6 further including manually controlled means operatively coupled to said valve closure control means for opening the first and second valves, these valves being electro-valves, and respective first and second switches for controlling the first and second valves respectively, and wherein said valve closure control means is coupled to means for successively actuating said first and second switches respectively for closing said electro-valves upon movement of said valve closure control means toward said cam and for successively actuating said second and first switches respectively for opening the electro-valves upon movement of said valve closure control means away from said cam caused by said manually controlled means.

8. Device as defined in claim 1 wherein said transmission means includes: a cone of gears having a plurality of parallel gears keyed on a common shaft, having different numbers of teeth; at least one further transmission gear; and a plurality of toothed selector wheels each controlled by said selector means to be selectively brought into joint engagement with one corresponding gear of said cone and said at least one further transmission gear, whereby different transmission ratios between said shaft and said further transmission gear can be selected.

9. Device as recited in claim 8 wherein said selector means includes a plurality of selector arms each supporting one of said selector wheels; adjustable notched cam means; and feeler means on each of said selector arms engaging said notched cam means for bringing the respective selector wheel into joint engagement with a corresponding gear of said cone and said at least one further transmission gear upon entering a notch on said cam means, said notched cam means being arranged with respect to said feeler means so that only the feeler means of one of said selector arms at a time can be lodged into such a notch on said cam means, whereby a desired transmission ratio is selected by adjusting said notched cam means to a corresponding position.

10. Device for predetermining the quantities of liquid delivered by a meter, said meter having valve means to control the delivery and means for measuring the quantity of liquid delivered, comprising:
valve closure control means;
movable means for actuating said valve closure control means upon completion of a constant predetermined displacement by said actuating means from a stop position to close said valve;
transmission means adapted to be coupled to the quantity measuring means for transmitting movement from the quantity measuring means to said actuating means with an adjustable transmission ratio to drive said actuating means over such constant predetermined displacement at a rate varying with the transmission ratio for any rate of movement of the quantity measuring means, whereby different predetermined quantities of liquid delivered can produce such constant predetermined displacement of said actuating means; and
selector means for selecting desired transmission ratios for said transmission means.

11. Device as defined in claim 10 wherein said selector means includes a plurality of selector clutches, each selector clutch controlling a given transmission ratio in said transmission means; adjustable notched cam means; and means on each of said selector clutches for engaging said cam means and actuating said selector clutches one at a time upon entering a notch to select a given transmission ratio.

12. Device as defined in claim 10 wherein said transmission means includes a rotatable cone of gears having a plurality of coaxial gear portions with different numbers of teeth; at least one further transmission gear; and a plurality of toothed selector wheels coupled to said selector means for being selectively brought into joint engagement each with one corresponding gear portion on said cone and said at least one further transmission gear, whereby different transmission ratios can be selected between said cone and said further transmission gear.

13. Device according to claim 12 wherein said actuating means include a rotatable cam having one abrupt change of profile and coupled for rotation to said transmission means, and said valve closure control means includes a feeler cooperating with the periphery of said cam upon rotation thereof and adapted for being operatively coupled to the valve means for initiating closure thereof by engaging said abrupt change of profile upon completion of one full revolution of said cam.

14. Device according to claim 13 further including manually operable means for jointly opening the valve means and setting said feeler in an inactive position wherein closure of the valve means is not initiated.

15. Device according to claim 13 further including manually operable means adapted for opening the valve means, means operatively coupled to said manually operable means for locking said feeler out of engagement with said cam upon opening the valve means, said locking means being responsive to the rotation of said cam over a predetermined angle from the stop position thereof for releasing said feeler into engagement with said cam.

* * * * *